March 17, 1931. M. WERBER 1,796,879
CUTTING BLOCK DRESSER
Filed Aug. 14, 1930
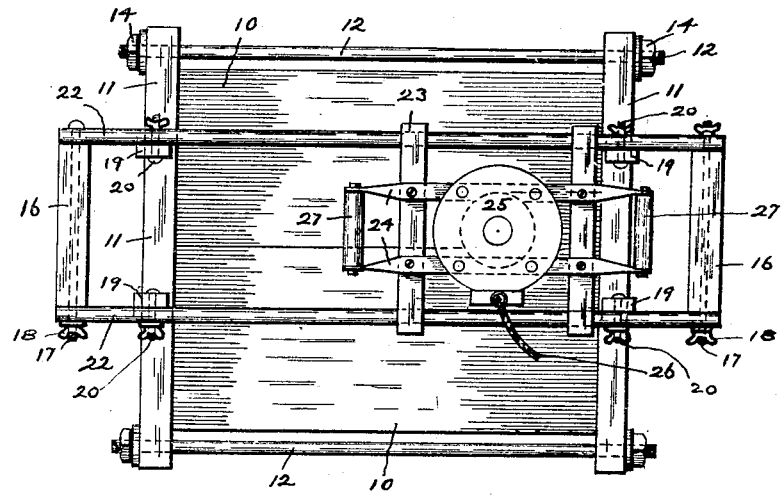
Fig 1
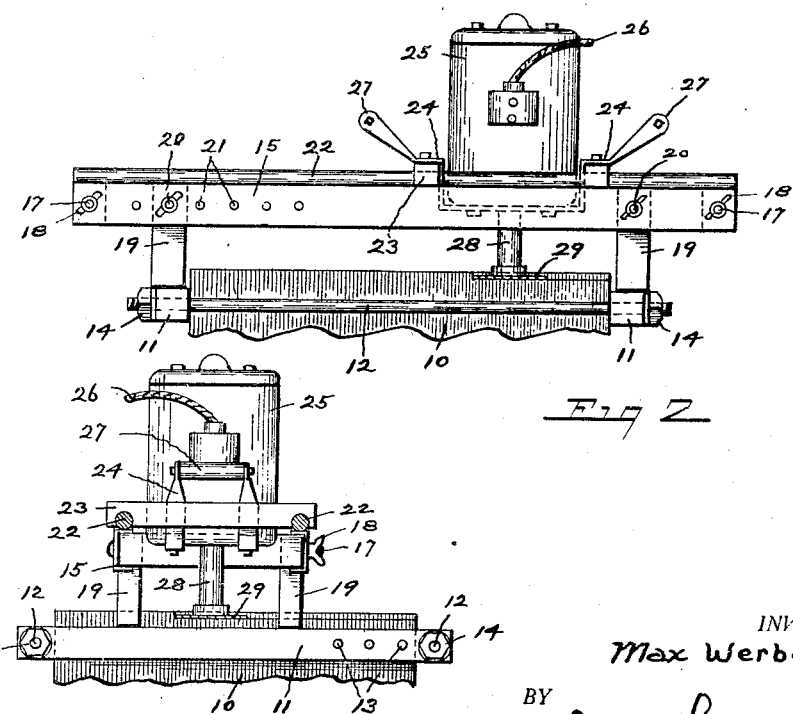
Fig 2
Fig 3
INVENTOR.
Max Werber.
BY John J. Thompson
ATTORNEY.

Patented Mar. 17, 1931

1,796,879

UNITED STATES PATENT OFFICE

MAX WERBER, OF BEACON, NEW YORK

CUTTING-BLOCK DRESSER

Application filed August 14, 1930. Serial No. 475,365.

This invention relates to a semi-portable machine for dressing or surfacing the tops of cutting blocks or tables of that class employed in the cutting of leather or other material used in making garments, although the invention is not confined thereto, as it may be used for resurfacing the tops of butcher blocks, or any cutting block which has an end grain surface.

Cutting tables or blocks as employed by garment makers upon which to lay the material to be cut either by hand with a knife or by a rotary cutter, are constructed of wood with the end grain forming the cutting surface, and by repeated cutting, this surface becomes rough and uneven and requires that a portion be removed to render the surface smooth, and by the present method, the table top has to be returned to the makers for resurfacing, which requires time and entails considerable cost.

The object of the present invention is to provide a machine which is self contained and which may be temporarily mounted upon the table top, and operated to remove a portion of the block to present a new surface.

Another object of the invention is to provide a machine that may be adjusted to remove any desired thickness of material from a block or table top, and which may be adjusted to operate on any size of table within its capacity.

With these and other objects in view, my invention consists in certain novel construction and combination of parts as will hereinafter be fully described and claimed, and illustrated in the accompanying drawings, which form a part hereof and in which like figures of reference refer to corresponding parts in all of the views, but it is understood that slight changes may be made without departing from the spirit of the invention.

In the drawings:—

Figure 1, is a top plan view, showing the device as attached to a cutting block and in the act of removing the worn surface.

Figure 2, is a side elevation of the same, and shows the mounting means as attached to the cutting block.

Figure 3, is an end view of the same.

Referring to the drawings:—

A garment cutting table top or block is indicated by the numeral 10, and to this is temporarily secured a pair of supporting guides 11 by a pair of rods 12 which are passed through holes 13 in said supports 11 and secured by the nuts 14 threaded thereon, in such a manner as to clamp the supports 11 against the opposite sides of the block 10, and slightly below the surface thereof as shown in Figures 2 and 3.

The block surfacing machine comprises a pair of channel members secured together in parallel relation by the cross braces 16 and the rods 17 extending therethrough and secured by the nuts 18 threaded thereon; and to said channel members 15 are secured the legs 19 by the bolts 20 passed therethrough and through any one of holes 21 in the sides of said members 15, thus providing adjustment for the spacing apart of the legs 19 which are adapted to be moved back and forth on the supports 11 during the resurfacing process.

Upon the upper edges of the members 15 are secured a pair of rods or tracks 22 and on which is slidably mounted a carriage comprising a pair of cross members 23 having holes in their ends to embrace said rods 22, and being secured together by a pair of U-shaped hangers 24, upon which is mounted a vertical motor 25 provided with an attachment cord 26 leading to a source of electrical power.

The ends of said U-shaped hangers are bent upward and secured to a pair of handles 27 by which the carriage is moved back and forth upon the track 22.

The shaft 28 of the motor 25 is provided with a circular saw 29 by which the cutting of the block is effected.

In the operation of the device the supports 11 are clamped to the opposite sides of the table top or block which is to be resurfaced; the legs 19 are then adjusted to rest upon said supports 11 in such a manner that the saw 29 will be in position to take a cut off of the surface of the block 10; the motor being started, the carriage is moved by the handles back and forth in such a manner that the saw 29 will remove a portion of the surface of the block, thus producing a new level surface for the top of the block; after each cut across the top, the machine is moved on the supports 11 to bring the saw in position for the next cut, and this action is repeated until the entire top has been gone over.

It will thus be seen that the depth of cut or portion removed by the saw is regulated by the position of the supports 11.

Having thus described my invention, what I claim as new and desire to secure by Letters Patent, is:—

A block dresser of the class described, comprising in combination with a temporary supporting means adapted to be secured to the sides of the block, of a frame comprising a pair of cross braces, a pair of parallel channel irons having their ends detachably secured to said braces, legs secured to said channel irons in both a detachable and adjustable manner and adapted to slide upon said temporary supporting means, tracks secured upon said channel irons in parallel relation thereto, a carriage comprising cross members slidably mounted on said tracks and a vertical motor carrying a circular saw and mounted on said carriage.

In testimony whereof I affix my signature.

MAX WERBER.